Patented Oct. 12, 1943

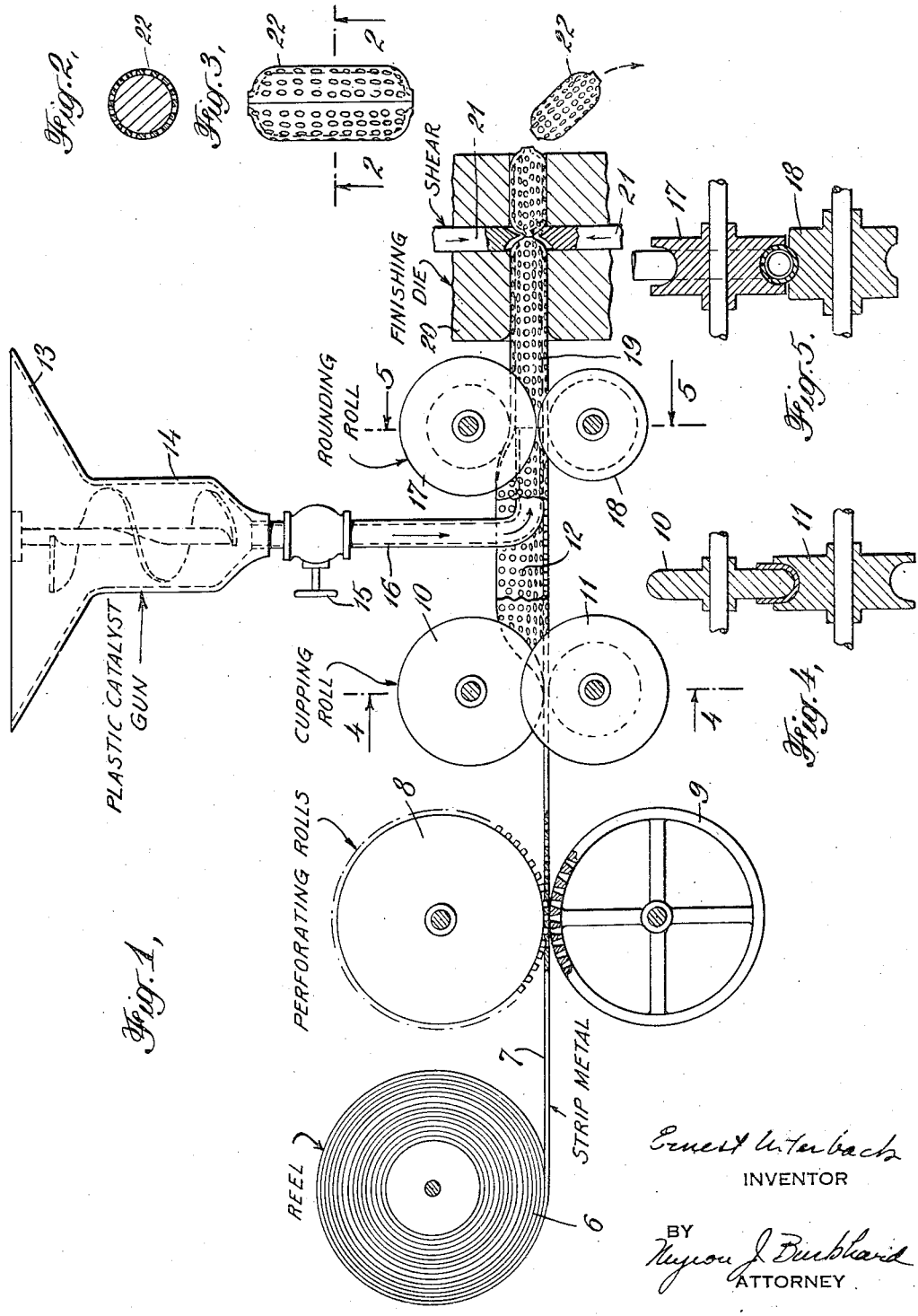

2,331,521

UNITED STATES PATENT OFFICE 2,331,521

METHOD OF MAKING CONTACT MASSES

Ernest Utterback, Oakmont, Pa., assignor to Socony-Vacuum Oil Company, Incorporated, New York, N. Y., a corporation of New York Application December 23, 1938, Serial No. 247,464

3 Claims. (Cl. 252—259.3)

This invention relates to contact mass materials used in operations involving alternate reaction of materials in the presence of a contact mass and regeneration of the contact mass. It is specifically concerned with contact masses which catalyze, promote, enter into, or assist in the treatment of materials, such as for example in the conversion by cracking, polymerization, controlled combustion, molecular rearrangement, chemical treatment, and the like of hydrocarbons and hydrocarbon derivatives. Such contact masses consist in the usual case of particles, pellets, or granules of a material of more or less refractory and adsorptive nature, which of itself may be capable of catalytically entering into or assisting in the desired reaction, or which may have other material of catalytic nature, such as metals or metal derivatives distributed upon or within the particles, etc., or which may promote the desired reaction by providing physical conditions suitable for its accomplishment.

As is well known, such contact masses for the most part are used in operations wherein the desired reaction is accompanied by the deposition of a combustible carbonaceous material upon and within the contact mass, which is removed by a regenerative combustion. The main reaction may be and usually is endothermic to some extent. The regeneration is highly exothermic. The main reaction is usually conducted at a temperature different from that of regeneration. Regeneration temperatures must be high to bring about complete regeneration, but must be below the limit at which the contact mass suffers degradation due to temperature. Such temperature alternations which in the usual case are about 200° F. or more, impose physical strain upon the contact mass particles, resulting in physical degradation. Further, such contact mass particles suffer physical degradation in normal handling even though that handling consists only of charging and discharging a contact mass container at infrequent intervals. The processes in which such contact masses are used are uniformly of the batch type insofar as a given volume of contact mass is concerned, for while processes exist and have been proposed wherein contact mass materials may be passed continuously through separate zones in which reaction and regeneration occur, no contact mass material promises to be capable of economically surviving the rather severe handling incident to such processes.

This invention has for its object the provision of an adequately protected contact mass particle capable of withstanding severe handling and temperature stresses without undue degradation. Another object is the provision of contact mass particles of enhanced heat adsorptive capacity and of enhanced heat conductivity. A further object is the provision of a method for making such contact mass particles.

The principal objects of this invention are accomplished by the provision of a pellet or particle of contact mass material enclosed within a foraminate or porous metal sheath. For the contact mass material, there may be used any of those materials already proposed and found practicable for such uses. For example, fire clays, kieselguhr, diatomaceous earth, fuller's earth, specially blended and specially treated clays and other material of similar nature may be used. As a specific example of this class of material, which forms an excellent catalyst for cracking of petroleum hydrocarbons, there may be described a mixture of silica and alumina in the proportion 3½:1 or 4:1 which is substantially free of the oxides of magnesium, calcium, and iron. Such materials are usually prepared for use as contact masses by molding a plastic or fluid mass of the material, wet with water or other treating agent, into particles of desired size. For various purposes, such as, for example, desulphurization of hydrocarbon gases, these materials may be impregnated, before or after molding, with metals or metal oxides. For other purposes they may be impregnated, before or after molding, with other materials, such as various inorganic salts, etc. All such contact mass material may be used in this invention.

Such contact masses, as indicated, are utilized in the form of particles, granules, or pellets of small size. For example, a popular form of contact mass particle consists of cylindrical pellets of about 2.5 millimeters diameter and about 2.5 millimeters long. Where the term particle is used herein, it denotes such pellets, or granules, or particles.

For the metal sheath there may be used any metal which does not undergo serious degradation under the conditions of reaction and which may be readily worked. It is possible to use a metal which may enter into the reaction catalytically or otherwise to some extent provided it is not physically altered thereby. It is preferable to use a metal of relatively high strength which is also possessed of relatively high heat capacity per unit of volume and has good heat conductivity. Iron and aluminum are exemplary metals which combine such properties with attractive cost and also appear to be applicable to most of the reactions in which such contact masses are used.

The metal is most conveniently and preferably used in the form of relatively thin strip material which is foraminate in nature, although any method of applying metal capable of accomplishing the purposes and objects herein desired and pointed out may be used. Metal which is imperforate and nonporous may also be used in some cases, as, for example in the formation of a particle consisting of a short metal tube, open at the ends, containing a catalytic core. In any event, the metallic material is one which enters into the operation as a homogeneous metallic material and which after being applied is possessed of a similar metallic form not substantially dependent upon the catalytic particle with which it is associated.

To more clearly understand this invention, reference is now made to the drawing attached to this specification in which drawing Figures 2 and 3 show a preferred form of contact mass pellet and Figure 1 shows, in diagram form the method of its production. Figures 4 and 5 show details of the forming operation.

Referring now to Figure 1, 6 denotes a reel upon which is stored strip metal 7, which passes under perforating roll 8 above die roll 9 and is there perforated. The strip 7 then passes between cupping rolls 10 and 11, shown in section in Figure 4, wherein the strip 7 is formed into a U shaped trough 12. Contact mass material, such as a prepared clay mixture, contained in bin 13 (shown partially) is fed by feeding device 14, which may be of any appropriate type, through valve 15 into pipe 16, wherein it is formed into a cylindrical rod and deposited within metal trough 12. After the contact mass material rod is thus placed within the trough 12, the composite strip passes through rounding rolls 17 and 18, shown in section in Figure 5, where the upstanding edges of the trough are bent over the clay to form a metal tube 19. This metal tube 19 then passes through a finishing die 20, after which it is cut into suitable lengths by a shear 21, the finished sheathed pellet being discharged at 22.

The final product appears at Figures 2 and 3. For most purposes a sufficient closure of the ends of the sheath is obtained by the shearing action at 21 in Figure 1. If a more complete closure is desired, or if for ease of packing into a contact mass, or for some other reason a rounded end is desired, this may be accomplished by an additional end forming operation not here shown, but obvious in its nature. For many purposes, the sheath end need not be even partially closed, and appropriate modifications in the shearing operation may be made to produce such pellet.

Contact mass particles so formed have high structural strength and a corresponding degree of resistivity to physical degradation resulting from handling and thermal expansion, even when the clay or other contact mass material has little intrinsic strength. This is of great advantage in that it permits the use of catalytic materials heretofore impractical because of structural weakness. Many materials not heretofore useful because of inability to retain a particle, pellet, or granule form under conditions of use may be taken advantage of.

Certain further advantages reside in the metallic sheath besides those arising from increased structural strength. These advantages arise from the increased heat absorption capacity of the entire contact mass and the increased heat conductivity of the entire contact mass when metal sheathed particles are used. These advantages are highly useful in types of operation when the contact mass is retained in fixed position as in a contact mass container wherein reaction and regeneration are alternately accomplished by passing appropriate material through the contact mass.

In such operations the use of a contact mass of high heat absorptive capacity permits of a more accurate control of temperature during reaction, since much heat may be handled in the form of sensible heat changes in the contact mass and need not be added or removed by other agencies. It is obvious that the combination of catalytic material and a metallic sheath presents a packing material of higher heat absorptive capacity.

As is well known, the usual means of control of exothermic reaction temperatures is by removing heat through the agency of a fluid heat transfer medium circulated in heat exchange relationship with the contact mass, usually through tubes embedded therein. Porous refractory adsorption contact mass materials of the types usually used are low in heat conductivity. Hence, in order to permit efficient heat extraction, the usual catalyst container is provided with heat transfer medium tubes to which are attached highly ramified metallic fin structures to bring all portions of the contact mass within efficient heat transfer distance of the tubes. Such construction is expensive to build and expensive to maintain. With a metal sheathed catalyst particle, the heat conductivity of the entire contact mass is so increased that these finned tube structures may be minimized and in some cases dispensed with.

The metallic sheath preferably should be so perforated as to provide sufficient access to the contained catalytic material. In normal cases this may be attained by use of a highly perforated sheet having 20 to 50% open area. In extreme cases, where high accessibility is desired and with stronger forms of contact mass material it is possible to use woven metal screen strip and such material is deemed the equivalent of strip metal in this disclosure and in the claims appended hereto.

The metallic sheath should be possessed of sufficient strength to protect the enclosed pellet against thermal expansion stresses and the abrasion, etc., due to normal handling. Where the operation is largely one where the catalyst remains in situ, the demands from this source are small, and may be satisfied by sheaths no thicker than the usually current commercial metallic foil. When greater structural strength is demanded, or when demands for heat absorptive capacity and heat conductivity are great, as is the usual case, the sheath material, however applied, should be much heavier, and with iron and aluminum, for example, for a sheathed pellet for use in vapor phase cracking, the metal may run as high as from 25% to 60% of the total volume of the finished pellet. In all cases, for a properly protected pellet, the sheath material must have strength in tension and against abrasion and in the predominant number of applications must have sufficient stiffness and strength of form to retain its shape substantially independently of the catalytic material with which it is associated. These properties can only be derived from the use of a metallic material, applied by such methods as give a final metallic sheath possessed of strength, continuity of structure, and form, all substantially independent of the enclosed particle.

It is known to form catalytic metals, as for example nickel, in extended form upon refractory material, by bathing or impregnating the refractory in a solution of a compound of the metal, and afterwards bringing about some reaction to produce the metal. Such processes may be said to produce a particle sheathed in metal, but not in the sense in which those terms are here employed. It is obvious that from such processes, the deposited metal can have no continuity of structure, since it is composed of discrete minute metallic particles, that it has no form independent of the refractory upon which it is laid down, and that the strength of the composite article is only the strength of the refractory.

It is also known to form composite catalyst consisting of a metal and a catalytic material such as a difficultly reducible oxide by mixing the metal oxide and the irreducible oxide and reducing the mixture to form a spongy material in which the oxide and metal are associated. It is obvious that such a method of fabricating catalytic material can give little control over the relative distribution of metal and catalyst, or over the proper protection of the catalytic material. It is more obvious that it is a method of highly restricted appliability and entirely useless for many materials having a desirable catalytic nature, but with little physical strength.

In the drawing the sheathed pellets are shown as cylinders. This invention is not limited to sheathed particles of such shapes, but includes particles of any desired shape, partially or wholly metal sheathed.

It is possible that other processes of forming sheathed particles are practicable. For example, a suspension of the contact mass material might be pumped into a previously formed tube and after it consolidates therein, the tube might be cut into pellets. Also other methods exist whereby preformed pellets may be enclosed in a porous or gas-permeable metallic sheath which is of sufficient structural strength to constitute a protective, reinforcing covering. While I consider the preferred method herein described as most practical, I consider all such methods to be its equivalent insofar as they result in the formation of a particle of contact mass material or catalytic material contained in and supported by a metallic sheath.

I claim:

1. Method for the manufacture of a catalytic particle comprising bending a strip of foraminate metal into a trough, depositing a non-metallic catalytic material in said trough, closing said metal trough around said catalytic material to form a rod and dividing said rod along its length to form composite particles of predetermined size each consisting of a core of catalytic material at least partially enclosed in a foraminous metallic sheath.

2. In a method for manufacturing a composite contact mass particle consisting of a non-metallic catalytic core and an enveloping metallic sheath, the steps of providing a partially pre-fabricated metallic tube, depositing non-metallic catalytic material in said tube forming said metal and said catalytic material together to give a composite rod of the diameter of the desired particle, and severing said composite rod into composite particles of desired length.

3. In a method for manufacturing a composite catalytic particle consisting of non-metallic catalytic core and an enveloping metallic sheath, the steps of providing a pervious shaped length of metal, depositing non-metallic catalytic material therein, forming said metal to envelop said catalytic material to give a composite rod of the cross section of the desired particle and severing said composite rod into particles of desired length.

ERNEST UTTERBACK.